United States Patent
Miller

[15] 3,671,859
[45] June 20, 1972

[54] FREQUENCY TRANSDUCER

[72] Inventor: Dewitt H. Miller, Waynesboro, Va.
[73] Assignee: General Electric Company
[22] Filed: Nov. 4, 1970
[21] Appl. No.: 86,751

[52] U.S. Cl. .................................................. 324/78 R
[51] Int. Cl. ............................................... G01r 23/02
[58] Field of Search .................. 324/78 R, 78 J, 78 S, 107,
324/86; 307/237; 329/127; 323/50

[56] References Cited

UNITED STATES PATENTS

| 2,947,863 | 8/1960 | Buie | 329/127 |
| 3,209,212 | 9/1965 | Billings | 324/78 S UX |
| 3,358,216 | 12/1967 | Kostuch | 323/50 X |

*Primary Examiner*—Alfred E. Smith
*Attorney*—Michael Masnik, Frank L. Neuhauser, Oscar B. Waddell and Joseph B. Forman

[57] ABSTRACT

A novel frequency transducer is disclosed, the transducer providing a uni-directional average signal output which is proportional to the frequency of an applied three-phase generally sinusoidal input signal. In a preferred inventive embodiment, the transducer comprises a three-phase transformer having primary, secondary and tertiary windings on a saturable core with voltage clipping means including the tertiary windings of the transformer. Rectification and summation means are also provided for summing and rectifying the outputs of the secondary windings of said transformer, those outputs being averaged by averaging means. The frequency transducer output is essentially independent of the voltage of the input signal.

5 Claims, 4 Drawing Figures

PATENTED JUN 20 1972 3,671,859

INVENTOR.
DeWITT H. MILLER
BY Michael Masnik
HIS ATTORNEY

FREQUENCY TRANSDUCER

BACKGROUND OF THE INVENTION

This invention generally relates to frequency transducers and is particularly concerned with an improved transducer system for providing a uni-directional average signal output which is proportional to the frequency of an applied input signal. Such systems have widespread utility as a frequency meter, as a frequency sensitive tachometer or as a frequency discriminator. In particular, the novel inventive system functions as a tachometer in the sense that the determination of the frequency of the voltage signal produced by a generator will directly yield the rotational speed of the generator's shaft.

A specific, yet still exemplary, area of utility of such systems wherein an analog output voltage proportional to input frequency is now required is that of generator excitation controls. These excitation controls have used volts/hertz regulator, limit, and other circuitry for the protection of transformers and the other magnetic components connected to the associated generator. As is known, the analog tachometers formerly connected to the shaft of typical large turbine generators have largely been replaced by tachometers of the digital type, and, accordingly, a voltage proportional to shaft speed is thus no longer readily available, such signal being required for excitation control.

BRIEF SUMMARY OF THE INVENTION

Thus, a need presently exists in this art for a frequency transducer which will provide a suitable analog output voltage signal proportional to the frequency of an applied input signal. The primary object of the present invention is to provide a device which will satisfy this need.

More specifically, but still in a broad sense, it is an object of the present invention to provide a frequency transducer which will produce an analog output signal proportional to input frequency, which output signal is virtually insensitive to applied voltage amplitude variation.

It is an additional object of the present invention to provide a frequency transducer operative to maximize the band width associated with the output analog signal while reducing the ripple on the output analog signal to an acceptable level.

A further object of the present invention is to provide a frequency transducer which is rugged, reliable and of inexpensive construction.

Yet, another object of the present invention is to provide a frequency transducer exhibiting stability and high resolution.

These objects as well as others which will become apparent as the description proceeds are implemented by the frequency transducer of the instant invention, which transducer in the preferred embodiment thereof comprises input terminal means for the application of a three-phase input signal, three-phase transformer means having windings on a saturable core or cores, voltage clipping means for limiting the voltage across said windings, rectification means for causing the output signal associated with each phase to be uni-directional, summation means for summing the rectified output associated with each phase, and averaging means for averaging the sum of the rectified outputs.

The voltage across each winding of the transformer means comprises a series of bipolar and generally rectangular pulses of substantially constant amplitude and time duration, these pulses occurring generally at the zero crossings of the voltage input to each particular phase. The substantially constant amplitude is produced by the invention in that the input signal exceeds the predetermined voltage limit which can be set by the voltage clipping means. The area of the generally rectangular pulses is held substantially constant in that the flux in the saturable core is proportional to the area, and when the flux in the saturable core associated with a particular phase is equal to the saturation flux, the impedance seen looking into a winding approaches zero. Resistors preferably provided in series with the primary windings of the transformer means then effect essentially a zero voltage to appear across the windings of a particular transformer phase. Since a pulse of a constant shape is passed through the transformer means, the output pulse associated therewith is of constant shape.

The rectification means associated with each phase will produce a uni-directional pulse occurring twice per cycle per each phase in the preferred embodiment and the output of the summation means then has the sum of six pulses per cycle and, due to the three-phase relationship, the output consists of an average signal plus a ripple signal with a fundamental frequency of six times the input frequency. This ripple is easily filtered while still providing reasonable band width associated with the average signal. As a result, the average signal is proportional to the number of pulses supplied to the output per cycle and to the area per pulse. The average value of the output is thus seen to be proportional to input frequency.

BRIEF DESCRIPTION OF THE DRAWINGS

The invention will be better understood, and objects other than those set fourth above will become apparent from the following detailed description of a preferred embodiment, such description making reference to the annexed drawings wherein.

DETAILED DESCRIPTION OF PREFERRED EMBODIMENTS

Figure 1P:
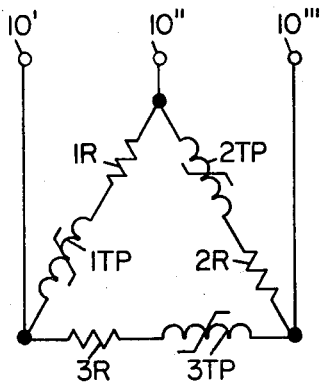
FIG. 1P depicts the three primary windings of the saturable core transformer of the invention connected in delta configuration.

Referring first to FIG. 1P, the input terminals of the device 10, 10'', 10''' are contemplated to be connected to a generally sinusoidal three phase source the frequency of which is to be measured. A typical source would be the three-phase voltages produced by a generator whose shaft rotational speed is to be monitored. Primary windings 1TP, 2TP, 3TP of a three-phase saturable core transformer provided each include a series current-limiting resistor 1R, 2R, 3R, respectively. The series combination of a primary winding and its associated current-limiting resistor are connected to the others in delta configuration across the input terminals.

Figure 1T:
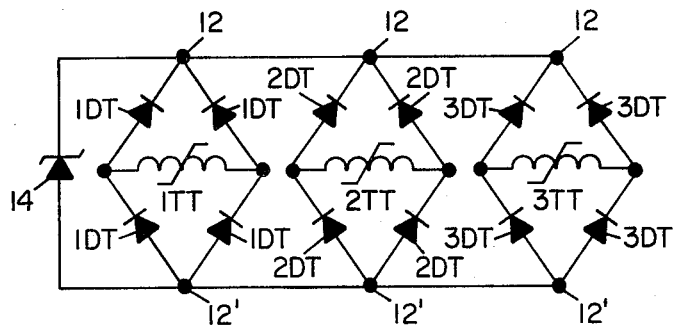
FIG. 1T depicts the three tertiary windings of the saturable core transformer of the invention, each associated with a rectifier bridge.

Referring next to FIG. 1T, it is seen that the three tertiary windings 1TT, 2TT, 3TT provided are each associated with a full wave diode bridge rectifier. For example, the first tertiary winding 1TT includes a full wave bridge rectifier consisting of the four diodes 1DT. If the voltage across a tertiary winding is bi-polar, the voltage at the output terminals of the full wave bridge 12, 12' is unidirectional. The output terminals of the full wave bridge rectifiers are connected in parallel across the zener diode 14. The unidirectional voltage appearing at 12, 12' is in a sense so as to reverse bias the zener diode. The zener diode exhibits an avalanche breakdown at some reverse voltage where voltage increases only very slightly with increasing current. Thus, if any of the tertiary winding voltages attempt to exceed the zener diode breakdown in either direction, a clipping action takes place. The voltage limiting action taking place at the tertiary winding of a particular phase is then seen also on the primary and secondary windings of that phase because of transformer action.

Thus, referring again to FIG. 1P, as the generally sinusoidal voltage input appearing across 10', 10'', for example, exceeds the voltage limit referred to the primary, any further increase in voltage appears across the resistor 1R and the voltage across 1TP remains substantially constant. Since the voltage across the primary winding 1TP, for example, is proportional to the time rate of change of flux in the saturable core linking primary, secondary and tertiary windings for the first phase, the flux increases substantially linearly with time until the saturation flux is reached. When the saturation flux is reached, the impedance seen across 1TP approaches zero and, because of the presence of current-limiting resistor R1, the voltage across the three windings for phase 1 approaches zero. A constant shaped generally rectangular pulse is thus produced substantially at the zero crossings of the sinusoidal signal applied to each phase. These pulses as appearing across the saturable core transformer windings are bi-polar.

Figure 1S:
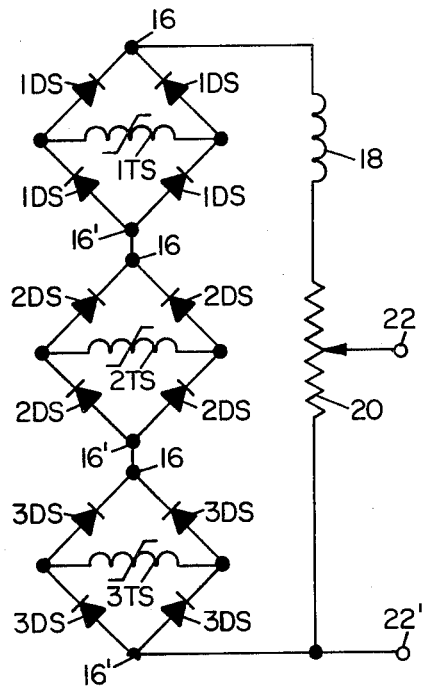
FIG. 1S depicts the three secondary windings of the saturable core transformer of the invention, each associated with a rectifier bridge.

Referring next to FIG. 1S, it is seen that the secondary windings of the saturable core transformer 1TS, 2TS, 3TS each are associated with preferably a full wave bridge rectifier. For example, the secondary winding for the first phase is associated with the bridge rectifier consisting of the four diodes labeled IDS. Each bridge rectifier converts the bi-polar pulses occurring across the secondary windings to unidirectional pulses appearing at the rectifier bridge output terminals 16, 16'.

The outputs of each rectifier are summed in a manner such that because of the symmetrical nature of the three-phase configuration, a ripple frequency appears at six times the frequency to be measured. An average voltage also appears which is proportional to the voltage times the duration of a pulse and to the number of pulses per cycle of input. The average voltage is then proportional to the frequency of the applied signal. The summation occurs by the connection of the three sets of bridge rectifier output terminals in series. This sum signal is next applied to an averaging means preferably in the form of a low-pass filter. The low-pass filter preferably comprises the series combination of a choke 18 and a potentiometer 20. The output terminals 22, 22' are suitable for application to an excitation control. Since the ripple frequency is six times the input frequency, this ripple component may be sufficiently attenuated while keeping the average of D.C. voltage seen at these terminals at reasonable band width. The potentiometer is used in order to adjust the scale factor of the output.

In order to achieve high resolution of nominally 60 hertz, the pulse duration produced by the combination of the saturable core transformer and the zener diode clipping element should be adjusted to be equal to a half cycle at approximately 80 hertz. The characteristic of the transducer thus adjusted is to produce an output proportional to frequency, except that for frequency greater than approximately 80 hertz, the output is constant.

At the expense of resolution, it is possible to take advantage of other summing means. If the pulse duration is adjusted so that there is no temporal overlap produced, at frequencies of interest, between the six pulses per cycle, the voltage across the zener diode 14 of FIG. 1T consists of the sum of the six pulses per cycle and then averaging means could be applied to this signal. This technique involves summation of currents rather than voltages due to each phase.

It is also possible to have a similar frequency transducer action without clipping means, that is, with the deletion of FIG. 1T. However, that approach does not yield as much voltage amplitude insensitivity as one skilled in the art might expect. Indeed, the area per pulse is substantially constrained by the saturable core itself. However, varying pulse duration caused by varying input amplitude will cause discrepancies in the average voltage output because of the variable pulse distortion between primary and secondary of the saturable core transformer.

Figure 2:
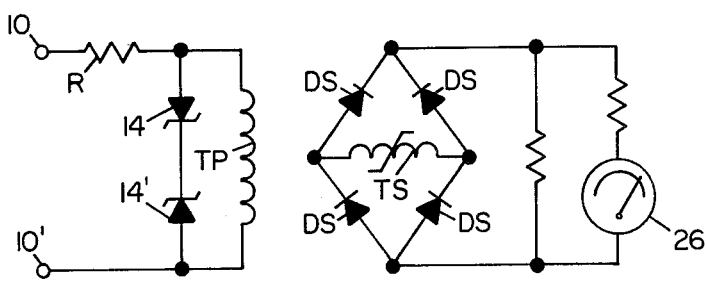
FIG. 2 shows a single phase alternative embodiment of the invention utilizing a primary and secondary winding on a saturable core.

Referring next to FIG. 2, there is shown a single phase alternate embodiment of the invention usable for frequency metering. The input terminals are 10, 10'. A current limiting resistor R again is in series with the single-phase saturable core transformer primary winding TP. However, here illustrated is the fact that voltage limiting could occur in the primary through the provision of back-to-back series Zener diodes 14, 14' across the primary TP. The secondary winding TS again includes a preferably full wave diode bridge having four diodes labeled DS. Further illustrated is that the averaging means could take the form of a galvanometer movement 26.

After reading the foregoing detailed description, it should be apparent that the objects set forth at the outset of the specification have been successfully achieved. Thus, while the invention has been shown, illustrated, described and disclosed in terms of embodiments or modifications which it has assumed in practice, the scope of the invention should not be deemed to be limited by the precise embodiments or modifications herein shown, illustrated, described and disclosed, such other embodiments or modifications intended to be reserved especially as they fall within the scope of the claims herein appended.

WHAT IS CLAIMED IS:

1. A frequency transducer providing a unidirectional average signal output proportional to the frequency of an input signal, said transducer comprising: input terminal means for connection to a generally sinusoidal input signal source having three phases; three-phase saturable core transformer means having primary, secondary and tertiary windings for each of said three phases; voltage clipping means including said tertiary windings of said transformer means; rectifier output means including rectification elements coupled to each of said secondary windings of said transformer means; means for summing the rectified outputs of said secondary windings; and averaging means for averaging the sum of said unidirectional outputs.

2. A frequency transducer as defined in claim 1, wherein said rectifier means comprise a full wave bridge rectifier.

3. A frequency transducer as defined in claim 1, wherein said voltage clipping means include a Zener diode.

4. The invention in accordance with claim 1 wherein said voltage clipping means further includes a full wave rectifier bridge associated with each tertiary winding and circuit means to connect each of the bridges in parallel with a single Zener diode.

5. The invention in accordance with claim 1 wherein the means for summing comprises the serial connection of the rectifier output means.

* * * * *